United States Patent
Armstrong

[11] Patent Number: 6,155,620
[45] Date of Patent: Dec. 5, 2000

[54] ERGONOMICALLY EFFICIENT TOOL

[76] Inventor: Jeffrey L. Armstrong, 5421 Hilltop Crescent, Oakland, Calif. 94618

[21] Appl. No.: 09/158,964

[22] Filed: Sep. 21, 1998

Related U.S. Application Data

[63] Continuation-in-part of application No. 08/660,516, Jun. 7, 1996, Pat. No. 5,810,408.

[51] Int. Cl.[7] .............................. B25G 1/04; A47L 13/10
[52] U.S. Cl. ............................ 294/57; 294/51; 294/53.5; 294/7; 15/105; 15/144.1
[58] Field of Search .............................. 294/19.1, 22, 23, 294/24, 49, 51, 53.5, 54.5, 57, 7; 37/265, 285; 172/372, 373, 375; 15/105, 114, 117, 143.1, 144.1–144.4; 16/110 R, 115; 81/177.2, 177.6, 177.7, 177.8, 177.9

[56] References Cited

U.S. PATENT DOCUMENTS

| | | | |
|---|---|---|---|
| 898,316 | 9/1908 | Carlson | ...................................... 15/117 |
| 1,268,734 | 6/1918 | Lay . | |
| 1,427,865 | 9/1922 | Szabo . | |
| 1,431,389 | 10/1922 | Frisz . | |
| 1,460,593 | 7/1923 | Lemoigne | .................................. 403/54 |
| 2,221,219 | 11/1940 | Nelson . | |
| 2,395,245 | 2/1946 | Booharin . | |
| 2,750,616 | 6/1956 | Klugman . | |
| 2,908,929 | 10/1959 | Cotman . | |
| 2,978,938 | 4/1961 | Nalley . | |
| 3,222,699 | 12/1965 | Zeisig . | |
| 3,624,855 | 12/1971 | Shaw | ...................................... 403/103 |
| 3,773,375 | 11/1973 | Nehls . | |
| 3,796,454 | 3/1974 | Williamson et al. | ........................ 294/7 |
| 4,281,433 | 8/1981 | Sendoykas | .................................. 15/105 |
| 4,565,398 | 1/1986 | Poulin . | |
| 4,704,758 | 11/1987 | Hoffman . | |
| 4,848,818 | 7/1989 | Smith . | |
| 4,985,961 | 1/1991 | Kegley . | |
| 5,060,343 | 10/1991 | Nisenbaum . | |
| 5,159,769 | 11/1992 | Odorisio . | |
| 5,206,998 | 5/1993 | Oriente et al. | ............................. 294/10 |
| 5,265,969 | 11/1993 | Chuang | ................................... 403/103 |
| 5,601,322 | 2/1997 | Forest | ........................................ 15/105 |
| 5,810,408 | 9/1998 | Armstrong | ................................ 294/57 |

FOREIGN PATENT DOCUMENTS

| | | |
|---|---|---|
| 57597 | 2/1953 | France . |
| 2142525 | 1/1985 | United Kingdom . |

OTHER PUBLICATIONS

"Back Saver Rake" ALSTO'S Handy Helpers, Michael Voyles—Vice President, Summer 1996.

*Primary Examiner*—Dean J. Kramer
*Attorney, Agent, or Firm*—Brian Beverly

[57] ABSTRACT

An improved ergonomically efficient tool having two adjustable and lockable bends allowing the handle to be bent to selected angles at each bend. An alternate embodiment includes a telescoping feature between the two bends allowing the handle length to be adjusted to the height of a user. The two bends and the telescoping feature cooperate to minimize a user's need to stoop over to use the tool and make it easier and more ergonomically efficient to use. A coupling feature in a further embodiment allows multiple tool heads to be easily attached to the bendable handle.

16 Claims, 7 Drawing Sheets

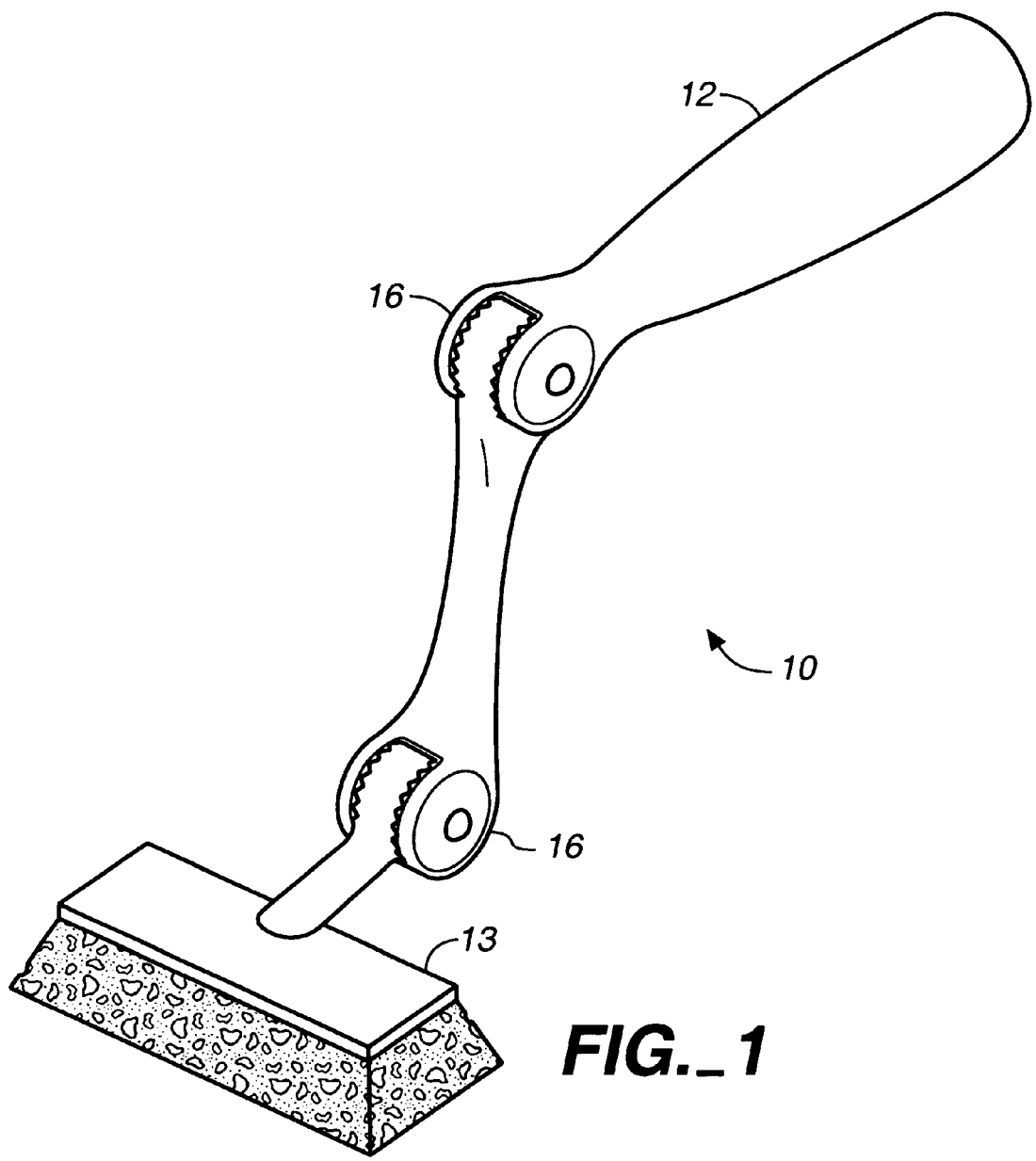
FIG._1

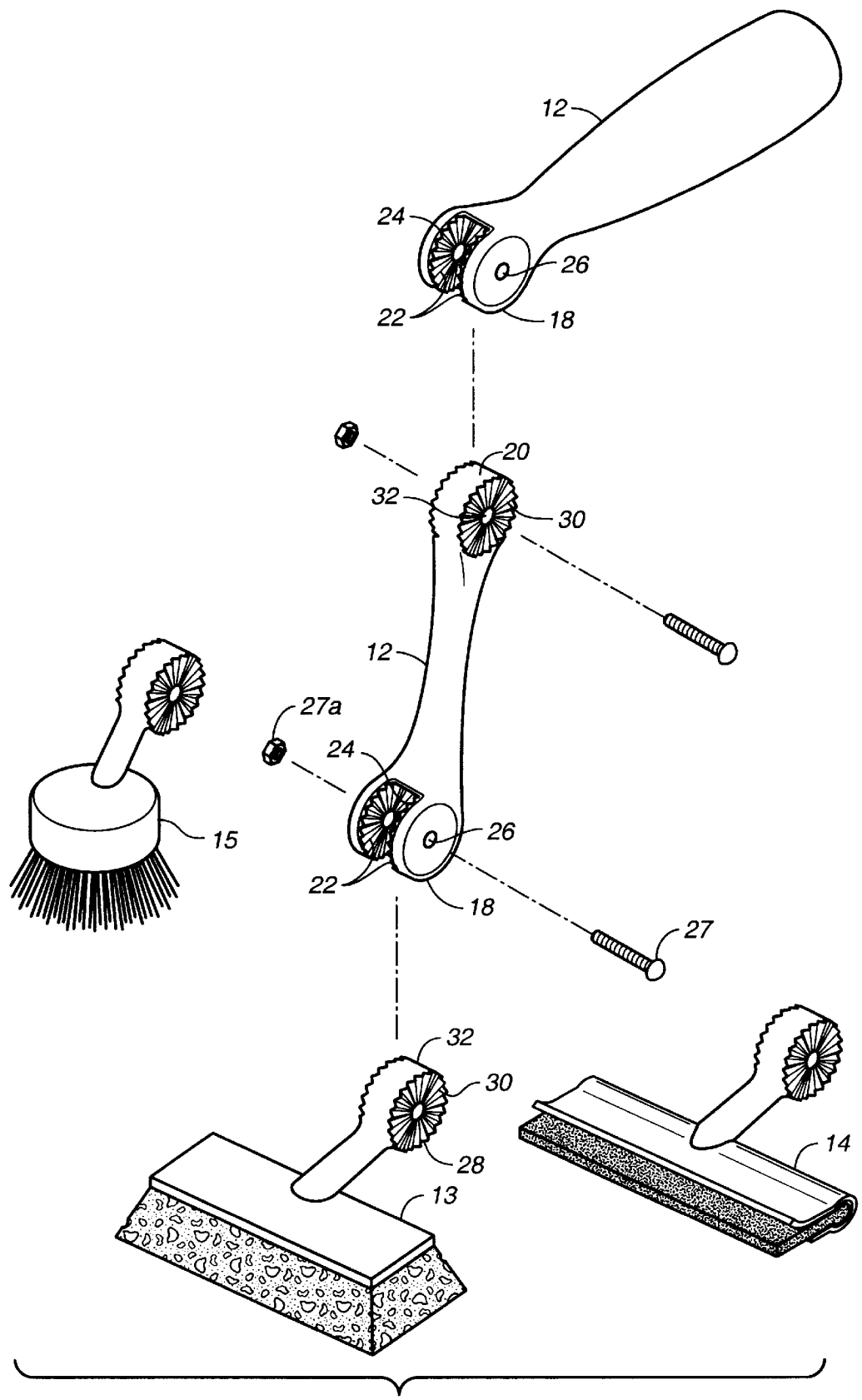
FIG._1A

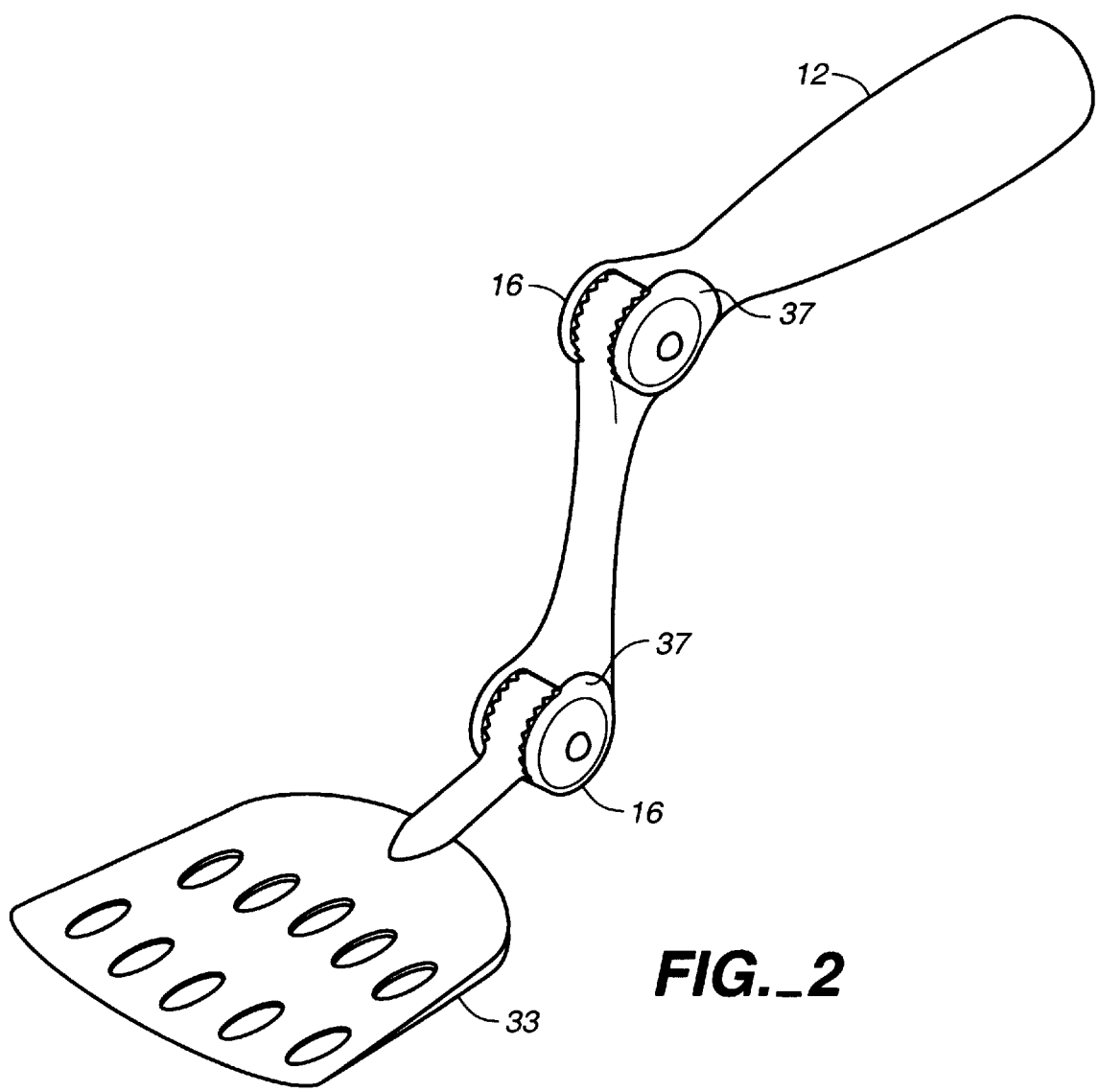
FIG._2

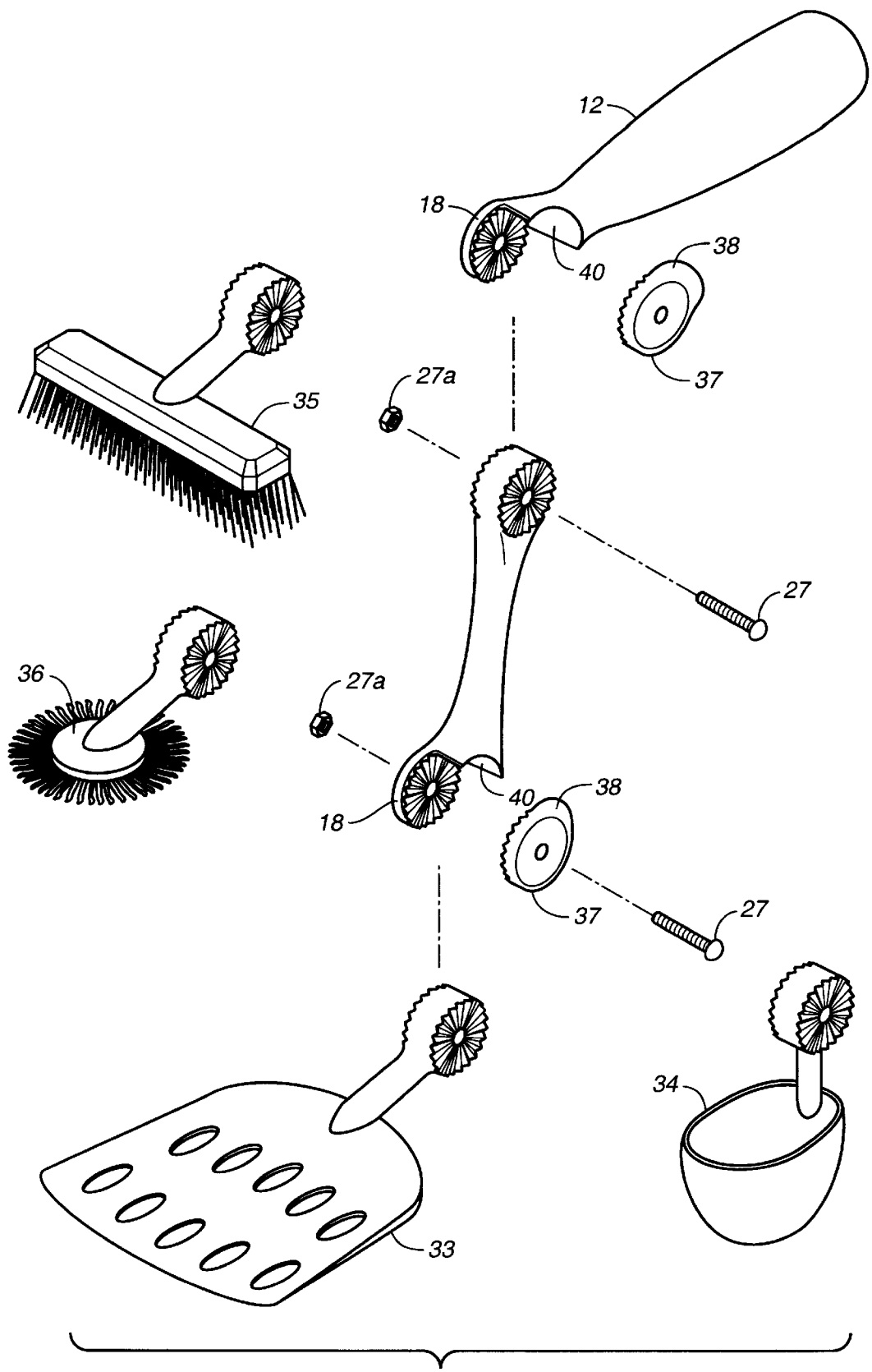
FIG._2A

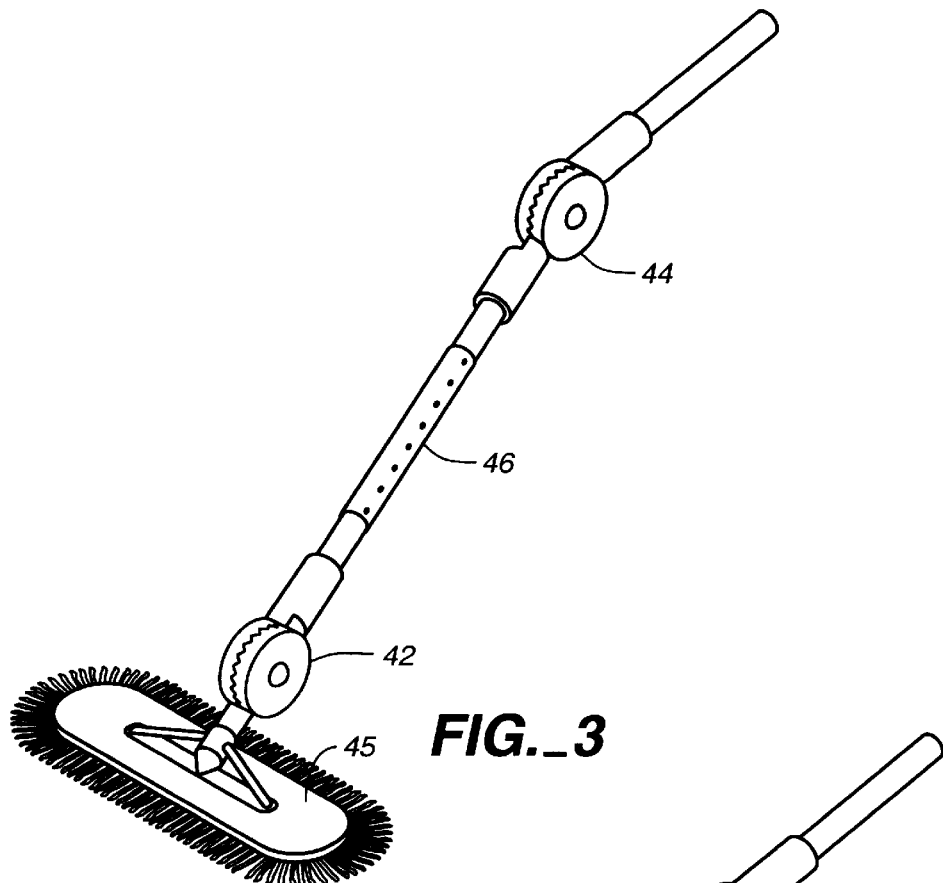
FIG._3
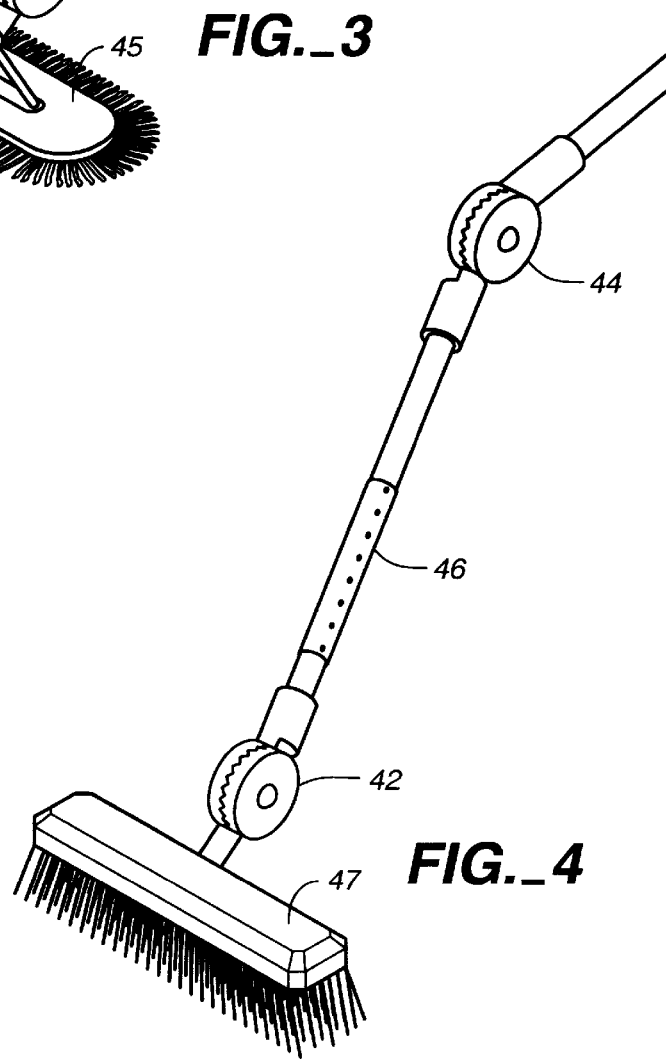
FIG._4

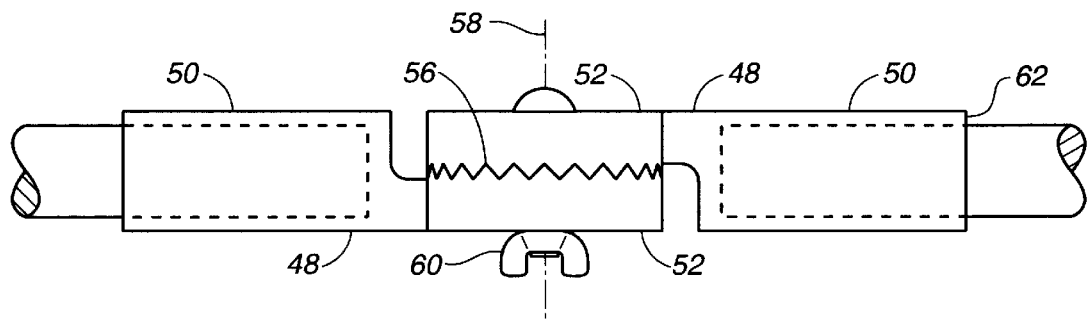
FIG._5
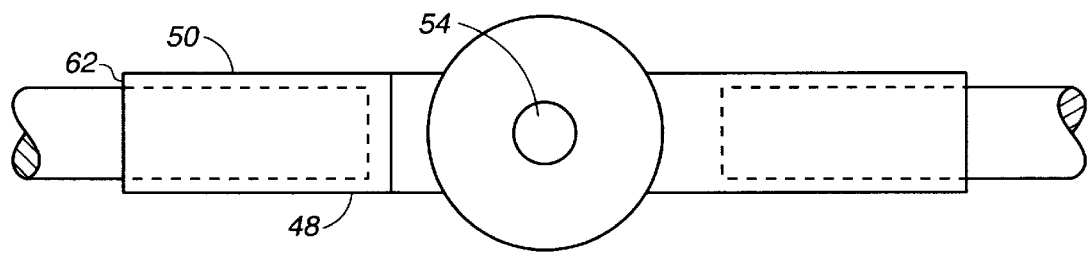
FIG._6
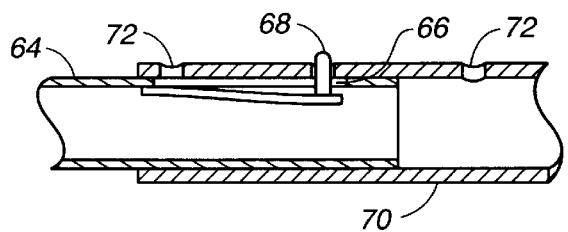
FIG._7

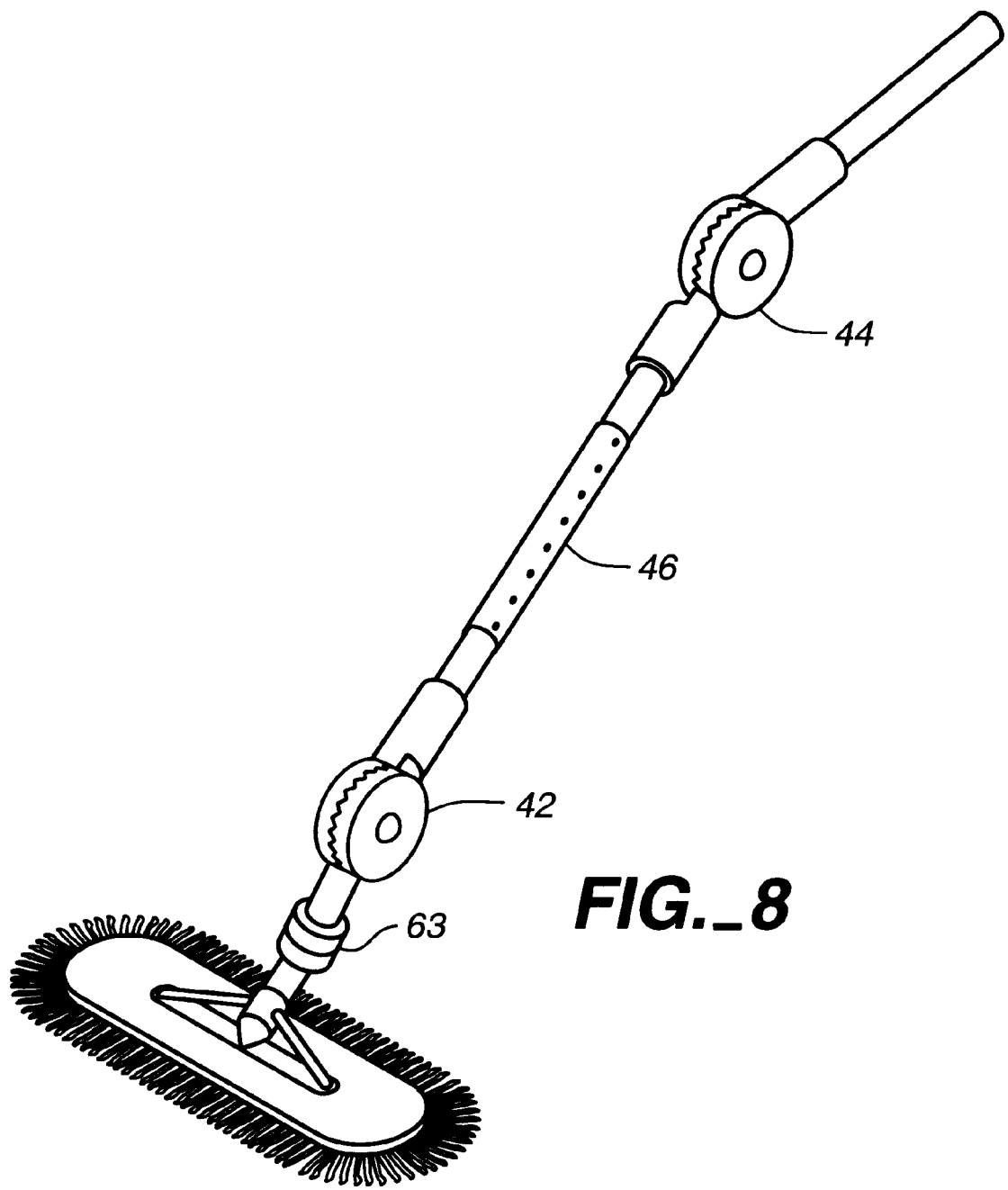
FIG._8

ERGONOMICALLY EFFICIENT TOOL

This is a continuation in part of Application Ser. No. 08/660,516, filed Jun. 7, 1996 now U.S. Pat. No. 5,810,408.

BACKGROUND

1. Field of the Invention

The present invention relates to an ergonomically efficient tool having a bendable handle allowing more efficient use of certain tool heads. The invention also relates to a tool having a telescoping feature in the handle, allowing the handle to be lengthened or shortened to accommodate the height of a user and make the tool more ergonomically efficient for the user. In another embodiment, a coupling mechanism allows attachment of more than one tool head to the handle.

2. Description of the Prior Art and Background Information

Commonly, hand-operated tools are provided with a simple elongated handle which is permanently and rigidly attached to the tool head. The tool head is then operated by manipulation of the handle. The angle at which the handle is affixed to the tool head is determined by the manufacturer. That angle is not adjustable, and the handle is not easily removable from the tool head. Accordingly, the angle at which the handle is attached to the tool head dictates the movement of the handle needed to accomplish the desired operation of the tool head. When considering the functions performed by specific tools, inefficiencies or inconveniences are inherent in tool heads having attached to them straight handles at a fixed angle. These inefficiencies or inconveniences can vary, depending upon the location of the task being performed and by the physical height of the individual using the tool.

In the case of a number of special tasks, the conventional elongated handle requires the user to stoop or bend over to accomplish the desired objective. Repetitive bending and stooping is tiresome and makes the job at hand more difficult. This is usually primarily an issue of efficiency, but in the case of some elderly or infirm persons, certain tasks cannot be performed at all. Further, some tasks are made more difficult by the lack of a handle. For example, the cleaning of a hot barbecue grill with a wire brush can be uncomfortable and may result in a burned hand. Scraping bricks or other rough surfaces with a wire brush is well known to produce skinned knuckles. In yet other situations, a tool may not be as efficiently maneuvered in tight spaces using a prior art handle.

Accordingly, there is a need with respect to certain tasks or operations for construction of a tool, and in particular the tool handle, which reduces stooping and bending, that keeps the tool head close to the work area while removing the user's hand from the work surface, and that increases maneuverability of the tool.

For example, the use of a brush to scrub a surface may require a certain amount of stooping over, depending upon the height of the surface to be scrubbed and the height of the tool user. In other circumstances, it would be useful to alter the angular relationship of the handle to the tool head from that found in a standard straight handle, such as in the case of a scrub brush.

Some efforts have been made to address the inefficiency of the standard straight-handled tool. The ergonometrically designed tool handle described in U.S. Pat. No. 5,060,343, Nisenbaum, describes a tool handle bent in three places with an offset hand grip midway down the handle. However, the Nisenbaum handle angles cannot be adjusted, nor can the handle be varied in length.

Similarly, the materials handling device described in U.S. Pat. No. 5,159,769, Odorisio, discloses a materials handling device handle bent at two angles to facilitate the user's ability to bring substantially maximum force on the materials handling device, a snow-removal plow. The bends in the Odorisio handle are designed to facilitate the user's ability to push the material handling device in a forward direction, rather than facilitating the user's ability to lift materials vertically, as with a spade. Moreover, the Odorisio handle bends cannot be adjusted, nor can the handle be lengthened or shortened.

A snow shovel with handle-mounted ice chopper is disclosed in Zeisig, U.S. Pat. No. 3,222,699. In Zeisig a snow shovel handle is bent upward at an acute angle from the blade portion of the device and is reverse bent at the same angle. This configuration is salutary in that it allows snow to be shoveled while the shoveler stands erect. However, the bends of the handle in Zeisig are fixed, and the handle cannot be lengthened or shortened.

A brush having a handle bendable at two points is disclosed in Lay, U.S. Pat. No. 1,268,734. The brush handle in Lay is adjustable, allowing the brush to reach a greater number of points, but the brush is confined to the same plane as the handle. The Lay brush is designed to be not excessively heavy.

A handle is disclosed in Hoffman, U.S. Pat. No. 4,704,758, which is adjustable and extendable. However, as is Zeisig, the Hoffman handle is configured entirely in the plane of the tool head with which it is used.

For specialized tools, a number of successful efforts have been made to provide handles which do a superior job of accommodating the user and allowing more efficient use of the tool. For example, Shea, U.S. Pat. No. Des. 360342, discloses a tool handle with a single bend in the handle for use with what appears to be a snow shovel. Vosbikian, U.S. Pat. No. 4,794,663, discloses a flexible dust mop handle. The handle has a rigid upper portion and a flexible lower portion, enabling use of the mop in difficult-to-reach places without bending or stooping on the part of the user. Lay, U.S. Pat. No. 1,268,734, discloses a brush having a handle bendable in two places for use with a light brush. Lay relates to a handle having angles disposed within the same plane wherein is also disposed the attached tool head.

Various other types of tool handles have been disclosed in the art, such as in U.S. Pat. No. 1,427,865, Szabo; U.S. Pat. No. 2,221,219, Nelson; U.S. Pat. No. 2,908,929, Cotman; U.S. Pat. No. 4,566,398, Poulin; and U.S. pat. No. 4,848,818, Smith; and French Patent No. 57597, Gaouyer.

None of the described tool handles solve the above-described needs and problems in the art. Accordingly, there is a need with respect to certain tasks or operations for construction of a particular tool handle which reduces stooping and bending, keeps the tool head close to the work area while removing the user's hand from the work surface, and that increases maneuverability of the tool head.

SUMMARY OF THE INVENTION

An ergonomically efficient tool, according to the invention, includes a handle having a first adjustable bend and a second adjustable bend. Each bend comprises two members in pivotal attachment, each member having a plurality of ridges radiating out from a center bore. A joining means, such as a threaded nut and bolt, passes through the center bore of each member and, when tightened, brings the ridges together so that they mesh and releasably lock in position. In an alternate embodiment of a handle used primarily with tool heads not for ground surface operations, the joining mechanism comprises a shackle and a pivot member. The pivot member is pivotally disposed in the recess of the shackle. Radial ridges on the inner surfaces of the side portions of the shackle mesh with radial ridges on the outer surfaces of the pivot member, such that when the shackle is clamped onto the pivot member, the shackle and pivot member are adjustably locked in a selected angular position.

In embodiments particularly appropriate for ground surface operations, the tool handle also has a telescoping feature located between the first and the second bends which allows the handle to be lengthened or shortened to accommodate the height of a user. Different tool heads, such as a mop or push broom, can be attached to the tool handle using any known coupling means. The unique combination of the two bends, together with the telescoping feature, allows a user to adjust the shape of the handle to the user's height and permits the tool head to be used to perform ground surface operations with a reduced need for stooping over.

It is therefore an object of the present invention to provide an improved tool of the type set forth.

It is another object of the present invention to provide an improved tool having a handle with two adjustable bends, allowing the handle to be adjustably bent in two places to enable the user to employ the tool in a more ergonomically efficient manner.

It is a further object of the present invention to provide an improved tool having a handle with two adjustable bends, each of which may be adjustably locked in a plurality of angled positions.

It is also an object of the invention to provide an improved tool having a handle with two adjustable bends and a telescoping feature allowing the handle to be lengthened or shortened between the two bends.

A further object of the invention is to provide an improved ergonomically efficient tool having an adjustably bendable handle and a coupling feature allowing easy attachment of a selection of various tool heads to the handle.

It is another object of the invention to provide an improved tool having a handle having two bends, each of which is lockably adjustable to a plurality of angles, the handle having a telescoping feature allowing the handle to be lengthened or shortened between the two bends, and a coupling feature allowing more than one tool head to be joined to the tool handle.

BRIEF DESCRIPTION OF THE DRAWINGS

FIG. 1 is a perspective view of an ergonomically efficient tool in accordance with the invention including a sponge attached to the bendable handle.

FIG. 1A is an exploded perspective view of the ergonomically efficient tool depicted in FIG. 1, also showing a toilet bowl brush and a squeegee which can be attached to the handle.

FIG. 2 is a perspective view of an ergonomically efficient tool in accordance with the invention, including a spatula blade attached to the bendable handle, and showing a detachable side portion on each shackle at each handle bend.

FIG. 2A is an exploded perspective view of the ergonomically efficient tool depicted in FIG. 2, also showing a ladle, a grill brush, and a small mop which can be attached to the handle.

FIG. 3 is an alternative embodiment of an ergonomically efficient tool in accordance with the invention including a floor mop attached to the handle and a telescoping mechanism located between the two bends of the handle.

FIG. 4 is an alternative embodiment of the ergonomically efficient tool shown in FIG. 3 showing a push broom attached to the handle.

FIG. 5 is a top view of one of the handle bends of the embodiments of an ergonomically efficient tool depicted in FIGS. 3 and 4.

FIG. 6 is a side view of the handle bend depicted in FIG. 5, showing the handle in a straight position.

FIG. 7 is a slice view of a telescoping mechanism of the type shown in the alternative embodiments of an ergonomically efficient tool depicted in FIGS. 3 and 4.

FIG. 8 is a perspective view of the alternative embodiment of the ergonomically efficient tool shown in FIG. 3, including a coupling mechanism.

DESCRIPTION OF THE ILLUSTRATED EMBODIMENTS

An ergonomically efficient tool as illustrated and described is generally indicated at 10 in FIG. 1. A handle 12 is fixed to a sponge 13. Alternatively, the handle could be attached to a squeegee 14 or toilet bowl brush 15 as seen in FIG. 1A. The handle 12 includes two bends 16 allowing the handle 12 to be bent at each bend 16 through a wide range of angles according to the individual preferences of the user for the tool head being used. The handle 12 can also be adjusted to a straight configuration if needed.

Each bend 16 of the handle 12 comprises a shackle 18 and pivot member 20 as best shown in FIG. 1A. The shackle has two opposing inner surfaces 22 having a series of radial ridges 24 radiating around a hole 26. The pivot member 20 has two outer surfaces 28, each having a series of radial ridges 30 disposed around a center bore 32. A common nut and bolt 27, 27a pass through the holes 26 of the side portions of the shackles 18 and through the center bore 32 of the pivot member 20. When the nut and bolt 27, 27a are tightened, the side portions of the shackle 18 are urged against the pivot member, locking it in a desired angular relation with the shackle 18. In operation, there is sufficient play between the pivot member 20 and the shackle 18 to allow them to be pivotally adjusted when the nut and bolt 27, 27a are loosened.

FIG. 2 depicts an alternate embodiment of an ergonomically efficient tool showing a spatula blade 33 attached to the handle 12. Alternatively, and similarly to FIG. 1A, different tool heads can be attached to the handle 12, including a ladle 34, a grill brush 35, and a small mop 36. The bends 16 of the embodiment shown in FIG. 2 include a detachable side portion 37 of the shackles 18 as can best be seen in FIG. 2A. The detachable side portion 37 includes an upstanding portion 38, which rests in a recess 40 in the handle 12 sized to snugly receive the upstanding portion 38. When the nut and bolt 27, 27a are tightened, the upstanding portion 38 is urged against the handle 12 and is prevented from pivoting around the bolt 27. The configuration of the bends 16 of this embodiment allows the sides of the shackle 18 to be spread for easier adjustment of the angularity of the handle 12. In actual operation, the angle of the bend would be adjusted by loosening the bolt and nut 27, 27a and releasing the detachable side portion 37 only so much as needed to adjust the angle of the bend. The bolt and nut 27, 27a would then be retightened, thereby pressing the detachable side portion 37 against the pivot member 20 and handle 12.

Alternate embodiments of an ergonomically efficient tool are shown generally in FIGS. 3 and 4. In the embodiments illustrated in FIGS. 3 and 4, the handles are shown to have a first bend 42, a second bend 44, and a telescoping mechanism 46 located between the first bend 42 and the second bend 44. The embodiment shown in FIG. 3 includes a mop 45. The alternate embodiment shown in FIG. 4 includes a push broom 47. The angularity of the handle can be adjusted as shown for example by the angle of the push broom 47 to the handle seen in FIG. 4 as compared to the relatively straight position of the mop 45 to the handle seen in FIG. 3.

In the handles depicted in the embodiments illustrated in FIGS. 3 and 4, the bends 42 and 44 have two members 48, each having a tubular portion 50, a proximal end 52 having a center bore 54 and a plurality of ridges 56 radiating out from the axis 58 of the center bore 54, and a joining mechanism 60, such as a common nut and bolt. The joining mechanism 60 urges together the opposing ridges 56 to releasably lock together the members 48 at a selected angle. The handle can thus be bent to any shape selected by the user allowed by the configuration of the radial ridges 56 of the bends 42 and 44. The joint members 48 are secured to the handle by insertion of the handle into the hollow interior 62 of the tubular portion 50.

It is anticipated that the embodiments depicted in FIGS. 3–6 would be constructed with strong materials that make the handle sufficiently sturdy to allow attachment of ground-surface tool heads, such as the mop 45 and push broom 47. Lighter materials also could be used, depending on the demands to be placed on the handle.

It is anticipated that the embodiments depicted in FIGS. 1, 1A, 2, and 2A will be of somewhat lighter construction for use of this handle embodiment with lighter tool heads, such as a sponge.

The handle embodiment depicted in FIGS. 1, 1A, 2, and 2A allow different tool heads to be exchanged by the simple mechanism of exchanging any one tool head having attached to it a pivot member 20 with any other tool attached a pivot member 20. The embodiments depicted in FIGS. 3 and 4 may exchange tool heads by substitution of any tool head attached one member 48 of the first bend 42 with any other tool head having a like member 50. In still another embodiment shown in is FIG. 8, a coupling mechanism 63 for exchanging a plurality of tool heads is provided between the tool head proper and the first bend 42.

As shown in FIG. 7, a telescoping mechanism 46 comprises a first tubular member 64 having a hole 66 and an outwardly biased retractable finger 68 projecting through and extending outward from the hole 66, and a second tubular member 70, having an inner diameter sized to receive the first tubular member 64. The second tubular member 70 has a plurality of longitudinally arranged holes 72 so that the handle can be lengthened or shortened to a plurality of securely fixed positions defined by the projection of the retractable finger 68 through one or another of the holes 72 in the second tubular portion 70. The telescoping mechanism 46 as illustrated fixes the handle at a selected length and prevents the portions of the handle above and below it from rotating relative to each other, thus maintaining the attached tool head in a plane at a right angle to the plane of the handle. Telescoping mechanisms are well known in the art and it can readily be seen that in other embodiments the telescoping of the handle could be accomplished by means other than the telescoping mechanism 46 as illustrated. It can be seen that the handle in FIG. 4 has been lengthened, as opposed to the handle in FIG. 3, using the telescoping mechanism 46.

There have thus been described certain preferred embodiments of an ergonomically efficient tool. While preferred embodiments have been described and disclosed, it will be recognized by those with skill in the art that modifications are within the true spirit and scope of the invention. The appended claims are intended to cover all such modifications.

What is claimed is:

1. An ergonomically efficient tool comprising:

a spatula blade, and a handle attached to said spatula blade, said handle having a holding end, a first bend member, and a second bend member, said first and said second bend members disposed between said holding end of said handle and said spatula blade, said handle bendable at said first bend member and bendable at said second bend member, such that said handle may be bent at said first bend member or at said second bend member, or at both, to use said spatula blade more efficiently.

2. An ergonomically efficient tool comprising:

a ladle bowl, and a handle attached to said a ladle bowl, said handle having a holding end, a first bend member, and a second bend member, said first and said second bend members disposed between said holding end of said handle and said ladle bowl, said handle bendable at said first bend member and bendable at said second bend member, such that said handle may be bent at said first bend member or at said second bend member, or at both, to use said ladle bowl more efficiently.

3. An ergonomically efficient tool comprising:

a spatula blade disposed in a first plane, and a handle attached to said spatula blade, said handle having a holding end, a first bend member, and a second bend member, said first and said second bend members disposed between said holding end of said handle and said spatula blade, said handle bendable at said first bend member and bendable at said second bend member, said handle disclosed in a second plane normal to said first plane, such that said handle may be bent at said first bend member or at said second bend member, or at both, to use said spatula blade more efficiently.

4. An ergonomically efficient tool comprising:

a ladle bowl disposed in a first plane, and a handle attached to said ladle bowl, said handle having a holding end, a first bend member, and a second bend member, said first and said second bend members disposed between said holding end of said handle and said ladle bowl, said handle bendable at said first bend member and bendable at said second bend member, said handle disposed in a second plane normal to said first plane, such that said handle may be bent at said first bend member or at said second bend member, or at both, to use said ladle bowl more efficiently.

5. An ergonomically efficient tool comprising:

a spatula blade disposed in a first plane, and a handle attached to said spatula blade, said handle having a holding end, a first bend member, said first bend member including adjustment means for adjustably fixing said handle at said first bend member in either a straight position or a plurality of angled positions, and a second bend member, said second bend member including adjustment means for adjustably fixing said handle at said second bend member in either a straight position or a plurality of angled positions, said first and said second bend members disposed between said holding end of said handle and said spatula blade, said handle disposed in a second plane normal to said first plane, such that said handle may be bent at said first bend member or at said second bend member, or at both, to use said spatula blade more efficiently.

6. An ergonomically efficient tool comprising:

a ladle bowl disposed in a first plane, and a handle attached to said ladle bowl, said handle having a holding end, a first bend member, said first bend member including adjustment means for adjustably fixing said handle at said first bend member in either a straight position or a plurality of angled positions, and a second bend member, said second bend member including adjustment means for adjustably fixing said handle at said second bend member in either a straight position or a plurality of angled positions, said first and said second bend members disposed between said holding end of said handle and said ladle bowl, said handle disposed in a second plane normal to said first plane, such that said handle may be bent at said first bend member or at said second bend member, or at both, to use said ladle bowl more efficiently.

7. An ergonomically efficient tool comprising:

a push broom disposed in a first plane, and a handle attached to said push broom, said handle having a holding end, a first bend member, said first bend member including adjustment means for adjustably fixing said handle at said first bend member in either a straight position or a plurality of angled positions, and a second bend member, said second bend member including adjustment means for adjustably fixing said handle at said second bend member in either a straight position or a plurality of angled positions, said first and said second bend members disposed between said holding end of said handle and said push broom, said handle disposed in a second plane normal to said first plane, and telescoping means between said first bend member and said second bend member for adjusting the length of said handle, such that said handle may be bent at said first bend member or at said second bend member, or at both, to use said push broom more efficiently.

8. An ergonomically efficient tool comprising:

a mop disposed in a first plane, and a handle attached to said mop, said handle having a holding end, a first bend member, said first bend member including adjustment means for adjustably fixing said handle at said first bend member in either a straight position or a plurality of angled positions, and a second bend member, said second bend member including adjustment means for adjustably fixing said handle at said second bend member in either a straight position or a plurality of angled positions, said first and said second bend members disposed between said holding end of said handle and said mop, said handle disposed in a second plane normal to said first plane, and telescoping means between said first bend member and said second bend member for adjusting the length of said handle, such that said handle may be bent at said first bend member or at said second bend member, or at both, to use said mop more efficiently.

9. An ergonomically efficient tool comprising:

a working end disposed in a first plane, and a handle attached to said working end, said handle having a holding end, a first bend member, said first bend member including adjustment means for adjustably fixing said handle at said first bend member in either a straight position or a plurality of angled positions, and a second bend member, said second bend member including adjustment means for adjustably fixing said handle at said second bend member in either a straight position or a plurality of angled positions, said first and said second bend members diagnosed between said holding end of said handle and said working end, said handle disposed in a second plane normal to said first plane, said adjustment means of said first bend and said second bend comprises a shackle having a recess and two spaced side portions, each said side portion having an inner surface and a hole, one of said side portions of said shackle being detachable, a pivot member having a center bore, said pivot member disposed in said recess of said shackle, threaded means disposed in said holes of said shackle and in said center bore of said pivot member for urging said side portions of said shackle against said pivot member, said pivot member pivotally joined to said shackle for rotational movement about said threaded means, such that said handle may be bent at said first bend member or at said second bend member, or at both, to use said working end more efficiently.

10. An ergonomically efficient tool system comprising:

a spatula blade disposed in a first plane, and a handle attached to said spatula blade, said handle having a holding end, a first bend member, and a second bend member, said first and said second bend members disposed between said holding end of said handle and said spatula blade, said handle disposed in a second plane normal to said first plane, said first bend and said second bend each including a shackle having a recess and two spaced side portions, each said side portion having an inner surface and a hole, and a pivot member having a center bore, each said inner surface of said side portions of said shackle having a plurality of ridges disposed radially around said hole, said pivot member having two outer surfaces, each said outer surface having a plurality of ridges disposed radially around said center bore which mesh with said ridges of said side portions of said shackle, threaded means disposed in said holes of said shackle and in said center bore of said pivot member for urging said side portions of said shackle against said pivot member, said pivot member movable pivotally about said threaded means, such that said pivot member may be adjustably locked in either a straight position or a plurality of angled positions, so that said handle may be bent at said first bend member or at said second bend member, or at both, to use said spatula blade more efficiently.

11. An ergonomically efficient tool system comprising:

a ladle bowl disposed in a first plane, and a handle attached to said ladle bowl, said handle having a holding end, a first bend member, and a second bend member, said first and said second bend members disposed between said holding end of said handle and said ladle bowl, said handle disposed in a second plane normal to said first plane, said first bend and said second bend each including a shackle having a recess and two spaced side portions, each said side portion having an inner surface and a hole, and a pivot member having a center bore, each said inner surface of said side portions of said shackle having a plurality of ridges disposed radially around said hole, said pivot member having two outer surfaces, each said outer surface having a plurality of ridges disposed radially around said center bore which mesh with said ridges of said side portions of said shackle, threaded means disposed in said holes of said shackle and in said center bore of said pivot member for urging said side portions of said shackle against said pivot member, said pivot member movable pivotally about said threaded means, such that said pivot member may be adjustably locked in either a straight position or a plurality of angled positions, so that said handle may be bent at said first bend member or at said second bend member, or at both, to use said ladle bowl more efficiently.

12. An ergonomically efficient tool system comprising:

a working end disposed in a first plane, and a handle attached to said working end, said handle having a holding end, a first bend member, and a second bend member, said first and said second bend members disposed between said holding end of said handle and said working end, and telescoping means between said first bend member and said second bend member for adjusting the length of said handle, said handle disposed in a second plane normal to said first plane, said first bend and said second bend each including a shackle having a recess and two spaced side portions, each said side portion having an inner surface and a hole, and a pivot member having a center bore, each said inner surface of said side portions of said shackle having a plurality of ridges disposed radially around said hole, said pivot member having two outer surfaces, each said outer surface having a plurality of ridges disposed radially around said center bore which mesh with said ridges of said side portions of said shackle, threaded means disposed in said holes of said shackle and in said center bore of said pivot member for urging said side portions of said shackle against said pivot member, said pivot member movable pivotally about said threaded means, such that said pivot member may be adjustably locked in either a straight position or a plurality of angled positions, so that said handle may be bent at said first bend member or at said second bend member, or at both, to use said working end more efficiently.

13. The ergonomically efficient tool of claim 12 wherein: said working end comprises a push broom.

14. The ergonomically efficient tool of claim 12 wherein: said working end comprises a mop.

15. An ergonomically efficient tool system comprising:

a handle having a holding end, a first bend member, and a second bend member, said handle bendable at said first bend member and bendable at said second bend member, said handle disposed in a first plane, a plurality of tool heads including a spatula and a brush, a coupling mechanism for removably attaching any selected one of said plurality of tool heads to said handle, said first and said second bend members of said handle disposed between said holding end of said handle and said coupling mechanism, any one of said plurality of tool heads, when attached to said handle, disposed in a second plane normal to said first plane.

16. An ergonomically efficient tool system comprising:

a handle having a holding end, a first bend member, said first bend member including means for adjustably fixing said handle at said first bend member in either a straight position or a plurality of angled positions, and a second bend member, said second bend member including means for adjustably fixing said handle at said second bend member in either a straight position or a plurality of angled positions, said handle bendable at said first bend member and bendable at said second bend member, said handle disposed in a first plane, telescoping means between said first bend member and said second bend member for adjusting the length of said handle, a plurality of tool heads, a coupling mechanism for removably attaching any selected one of said plurality of tool heads to said handle, said first and said second bend members of said handle disposed between said holding end of said handle and said coupling mechanism, any one of said plurality of tool heads, when attached to said handle, disposed in a second plane normal to said first plane.

* * * * *

UNITED STATES PATENT AND TRADEMARK OFFICE
CERTIFICATE OF CORRECTION

PATENT NO : 6,155,620
DATED : December 5, 2000
INVENTOR(S) : Jeffrey L. Armstrong It is certified that error appears in the above-identified patent and that said Letters Patent are hereby corrected as shown below:

column 6, line 26, delete the second instance of "a".

column 6, line 44, change "disclosed" to –disposed–.

column 8, line 18, change "diagnosed" to –disposed–.

Signed and Sealed this

First Day of May, 2001

Attest:

NICHOLAS P. GODICI

Attesting Officer    Acting Director of the United States Patent and Trademark Office